United States Patent [19]
Lou

[11] 3,912,610
[45] Oct. 14, 1975

[54] METHOD FOR ELECTROQUANTITATIVE DETERMINATION OF PROTEINS

[75] Inventor: Kingdon Lou, Tustin, Calif.

[73] Assignee: ICL/Scientific, Fountain Valley, Calif.

[22] Filed: July 23, 1974

[21] Appl. No.: 491,069

[52] U.S. Cl. .......................... 204/180 G; 23/230 B
[51] Int. Cl.² ........................................ B01K 5/00
[58] Field of Search ............ 204/180 G, 180 S, 299; 23/230 B

[56] References Cited
UNITED STATES PATENTS

| | | | |
|---|---|---|---|
| 3,558,459 | 1/1971 | Granstrand et al. ............ | 204/180 G |
| 3,607,695 | 9/1971 | Schneider .................... | 204/180 G X |
| 3,692,654 | 9/1972 | Svendson ..................... | 204/180 G X |
| 3,770,603 | 11/1973 | Grubhofer et al. ............. | 204/180 R |

*Primary Examiner*—John H. Mack
*Assistant Examiner*—A. C. Prescott
*Attorney, Agent, or Firm*—Fulwider Patton Rieber Lee & Utecht

[57] ABSTRACT

The electromobility of protein molecules which normally exhibit very slight anodic electromobility is increased by linking the molecules to at least one highly anodic electromobile protein molecule. The antigenic activity of the linked protein molecules is not affected by the linking reaction so that the electroquantitative determination of protein molecules which are normally detectable by the slower diffusion is practicable. The linking agent is a bi-functional material with gluteraldehyde being highly preferred. The amount of linking agent is kept below the amount which will form a polymer gel.

23 Claims, 1 Drawing Figure

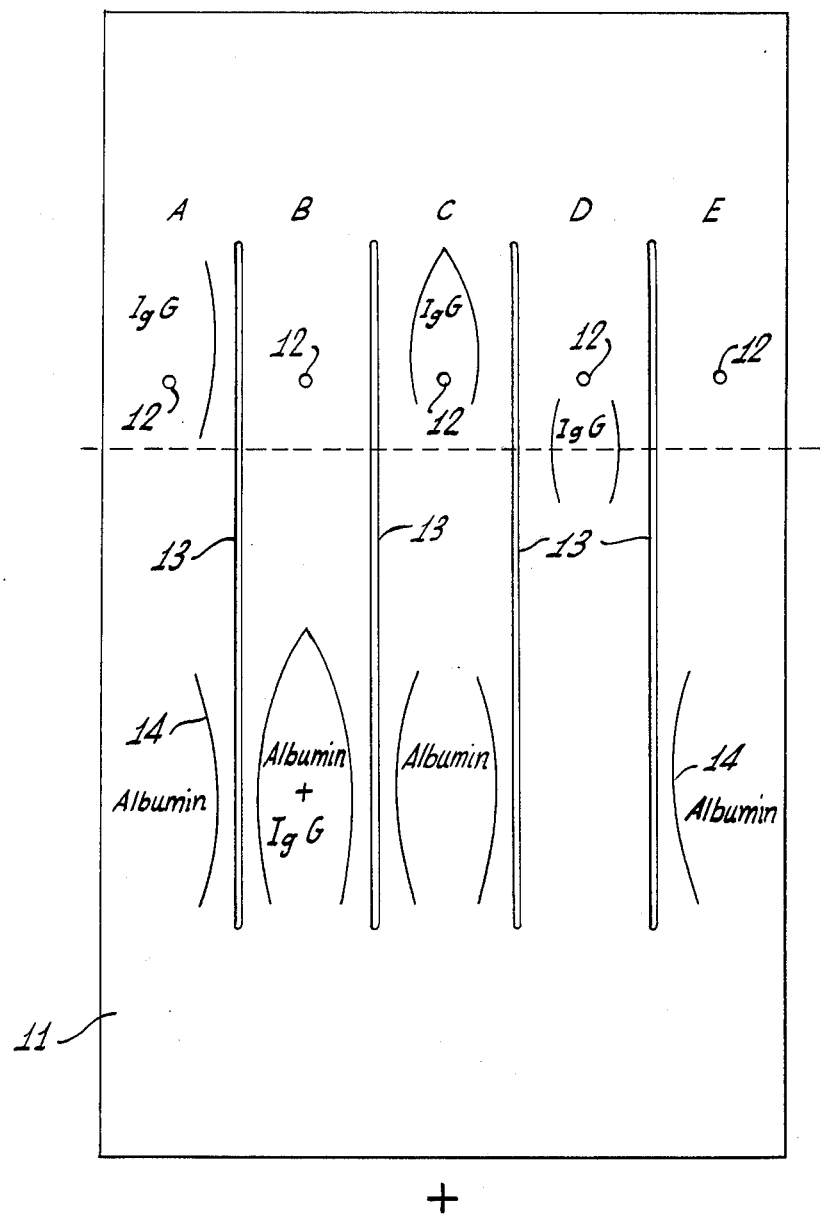

METHOD FOR ELECTROQUANTITATIVE DETERMINATION OF PROTEINS

BACKGROUND OF THE INVENTION

This invention relates to the electrophoretic determination of proteins and more particularly to a method for enhancing the electromobility of blood proteins to improve the quantitative determination thereof by electrophoretic techniques.

The quantitative determination of protein in blood serum has become increasing important as a diagnostic tool in treatment of disease. Of particular interest insofar as the present invention is concerned is the quantitative determination of the immunoglobulins of the blood serum.

Of the various techniques available at the present time for quantitatively determining the proteinaceous components of blood serum, electrophoretic techniques are preferred as a diagnostic tool since they are relatively fast and can be utilized in most laboratory and hospital facilities. In general the techniques involve the separation of components based on differences of electromobility of the proteinaceous components in an electric field. An electrophoretic technique favored as a diagnostic tool for determination of immunoglobulins is electroimmunodiffusion. In this method a sample is placed in a well formed in a gel layer and an electric current passed through the gel causing the serum components to migrate. The gel contains an antibody which is specific for the component being sought. As the sought component migrates through the gel a precipitate is formed when the proper ratio of component to antibody is achieved. The precipitation is normally visible and forms a rocket shaped zone extending from the well towards an electrode, the anode under normal test conditions. By measuring the rocket and comparing the measurement to measurement of the rockets of known standards the quantity of the component is determined.

Certain serum components, however, are difficult to quantitatively determine because of the relatively low electromobility exhibited under the test conditions. Such components include the so called gamma globulins such as globulin A, H, G, D and B. These proteins are also referred to as immunoglobulins (Ig) because of their disease preventing function exhibit very little movement during electrophoresis and thus do not form rockets whose measurements are are concentration dependent. This lack of movement is most likely due to the fact that under the conditions of electrophoresis pH is maintained between 8.2 to 8.6 and the net changes on the molecules are nearly balanced. Thus during electrophoresis there is a slight movement of IgG and IgM towards the anode but so slightly as to make practical measurement of the rocket shaped precipitation zone highly inaccurate.

Numerous attempts to improve the electromobility of the immunoglobulins, praticularly IgG have been disclosed in the prior art. Thus, for example, Weeke in "Scand. J. Clin. Lab. Invest." 21 (1968) page 351 describes a procedure for enhancing detection of immunoglobulin by carbamylating the antiimuno globulins thereby to change the mobility of the antigen in the gel. A similar technique is disclosed in U.S. Pat. No. 3,558,459, Granstand, et al., where the antiimmunoblobulin is treated with an amino group blocking agent, such as succinic anhydride, to increase the electromobility of the antigen. These techniques require 18 and 20 hours to prepare the antigen and require highly trained and skillful personnel in order to obtain reproducible results.

Another approach involves the treatment of the immunoglobulin itself by reducing the positive charge in order to increase its electromobility. Stephan and Frahm in "Z. Klin, Chem. Klin, Biochem", 9 (1971) page 224 recommend treatment with B-propiolactone to accomplish this end. However, such treatment is time consuming and may result in altering the antigenic activity of the immunoglobulin. Treatment of immunoglobulins with formaldehyde has also been suggested as a positive charge reducer.

SUMMARY OF THE INVENTION

The present invention relates to the enhancement of the electromobility of a proteinaceous material which normally exhibit low mobility under the conditions of electrophoresis. In accordance with the present invention a reaction product is formed comprising an electromobile proteinaceous material, a dialdehyde and the proteinaceous material whose electromobility it is desired to enhance. In this manner the electromobility of the reaction product becomes essentially that of the most electromobile proteinaceous component thereof. At the same time the antigenic activities of the proteinaceous components of the reaction product are umimpaired so that at least one of the proteinaceous components of the reaction product can be quantitatively determined by precipitation reaction with an antibody specific to that portion.

Other features and advantages of the present invention will be apparent from the following detailed description of the invention and accompanying drawing.

BRIEF DESCRIPTION OF THE DRAWING

The FIGURE is a representation of an immunoelectrophoresis plate illustrating the precipitation bands and the degree of electromobility of untreated immunoglobulin and albumin and immunoglobulin treated in accordance with the invention.

DESCRIPTION OF THE INVENTION

The present invention is embodied in the enhancement of the electromobility of proteinaceous materials such as the immunoglobulins by a linking reaction thereof with an electromobile protein by the action of a dialdehyde. For example, albumin exhibits a high degree of electromobility under the test conditions normally encountered inn electrophoretic analysis of blood serum. It has been found that an immunoglobulin, such as IgG or IgM can be linked to albumin and thereby be carried by or otherwise achieve the electromobility of the albumin molecule. Most importantly it has been found that the linking reaction is relatively rapid and easy to perform. There is no significant loss of antigenic activity on the part of the immunoglobulin so linked and the albumin does not interfere or effect the quantitative determination of the immunoglobublin except to substantially increeease its electromobility.

Because of the improtance, in the treatment of disease and the like, of the level of antigen in blood serum, the description of the present invention will be directed towards the enhancement of the electromobility of globulins in blood plasma. However, it should be understood that the principles of the invention apply in the electrophoretic analysis of other proteins as well, whose electrobility must be enhanced in order to achieve effective quantitative electrophoretic determmination. Accordingly, in addition to providing an improved diagnostic procedure for medical purposes, the present invention also provides a method for improving industrial and research techniques for the detection and quantitative determination of proteins.

The analysis of blood proteins is normally conducted on blood serum, that is blood plasma from which the fibrogen content has been removed by clotting. Albumin, which is a highly electromobile protein, is a dominant component of the protein fraction of blood serum. The globulins, which are also referred to as immunoblobulins and as antigens, are a second important protein group contained in the blood serum. Probably the most studied protein fraction of the serum is the gamma globulin fraction which, among other things, protects the body against diseases such as measles and hepatitis. The gammaglobulins are classified as IgA, IgG, IgE, IgM and IgD. The globulins are classified according to differences is electromobility with IgG being the least mobile.

IgG, which is usually of greatest interest, is present in normal human serum in a ratio of about 1 part IgG to about 4–5 parts alubmin. Deviation from the normal range, either on the high or low side, signals an abnormality. Consequently, the quantitative determination of IgG has served as an adjunct tool in diagnosis and has been useful in monitoring efficiency of therapy and ascertaining prognosis in disease states. Similarly, deviations in the levels of other globulins may indicate abnormalities although the function of other globulins and some proteins in blood serum is not as well understood.

At the desired pH range of 8.2 to 8.6 the molecular charge of the gamma globlulins, particularly IgG is substantially balanced and the globulins are only slighly electromobile. Under these conditions electrophoretic quantitative determination of gamma globulins is not possible, although other proteinaceous components of blood plasma, such as serum albumin, are highly mobile.

Therefore, in the quantitative determination of IgG and other globulins by electrophoretic techniques in accordance with the present invention albumin has been found highly effective as the electromobile component of the reaction product. In addition to being highly electromobile albumin is not detrimental in the quantitative determination of other proteins. When assaying blood proteins, the use of albumin is highly advantageous because it is naturally present as a substantial portion of the blood protein. In cases of hypergammaglobulinenia, however, the addition of purified albumin to the serum being tested is desirable to insure a ratio of at least about 4–5 parts albumin to about 1 part IgG.

The precise structure of the reaction product formed in accordance with the present invention is not fully understood, however, it is believed that one or more molecules of the electromobile protein are linked to a molecule of the less mobile protein. In this manner the electromobile molecule or molecules under the influence of an electric current carry the less mobile molecule and in effect impart to the less mobile molecule substantially the electromobility of the mobile molecules.

To form the electromobile reaction product, a bifunctional reagent is utilized as the linking agent. Bifunctional reagents such as bifunctional alkyl and aryl halides such as p,p-difluoro-m,m-dinitrodiphenyl sulfone, bifunctional imido esters such as diethyl malonimidate dihydrochloride, dimethyladipimidate dialdehydes, and the like are useful in linking the electromobile protein molecule with the less mobile protein molecule.

The highly preferred linking agent employed to form the reaction product is the di-aldehyde of glutaric acid, gluteraldehyde ($HCO(CH_2)_3CHO$). Gluteraldehyde is recognized for its ability to form intra- and intermolecular links with protein molecules and the reaction per se does not form a part of this invention. Gluteraldehyde is preferred, however, since the desired linking reaction occurs rapidly at room temperature and gluteraldehyde is water soluble allowing it to be solubilized in aqueous buffer solutions so that the pH of the reaction mixture can be readily controlled.

In forming the reaction product with the linking agent it is important that the concentration of the linking agent be kept below the polymer gel forming concentrate. In the case of gluteradehyde, excellent results are obtained when the final gluteraldehyde concentration in the test sample is maintained between about 0.005 and about 0.02 M, with a preferred concentration of about 0.008 M.

In accordance with an important aspect of the present invention, the linking reaction between the mobile protein and less mobile protein through the gluteraldehyde occurs relatively rapidly at room temperature with no special reaction conditions required. Thus in carrying out the linking reaction an aqueous gluteraldehyde solution is mixed with the test sample and the admmixture is held for sufficient period to effect the linking reaction. The period required to effect the reaction has been determined to be on the order of 15 minutes although it is preferred that the reaction mixture be held between 30 minutes and 1 hour to insure completion of the linking reaction.

In preparing the aqueous gluteraldehyde solution it is necessary to adjust the pH of the solution prior to its admixture with the protein test sample since gluteraldehyde normally has a pH of about 3.0. This may be accomplished by adjusting the solution pH with a suitable alkaline material such as sodium hydroxide or, preferably, preparing the gluteraldehyde solution in an alkaline buffer. The solution should be brought to pH at which the electrophoresis is to be conducted and in the case of the electrophoresis of blood protein the preferred range is between 7.5 and 8.6.

As is known in the prior art, the choice of a particular buffer solution is dependent upon many factors, not the least of which is the nature of the protein to be determined. The ionic strength of the buffer is preferably kept as low as consistent with its buffering capacity and its power of protein resolution in order to minimize current flow. The most common buffer systems employed in electrophoretic protein determination are system comprising an aqueous solution of sodium barbital and an acid such as hydrochloric, acetic or barbituric acid. An excellent buffer system has been found to be an aqueous solution of tris(hydroxymethyl)amino-methane, boric acid and the di-sodium salt of ethylene diamine tetra-acetic acid.

In carrying out the quantitative determination of proteins any of several well known techniques may be utilized and the increased electromobility imparted to normally immobile or only slightly mobile protein molecules results in a substantial improvement in the quantitative determination of such proteins. The term electroquantitation as used herein is applied to known electrophretic protein separation techniques, such as tube electrophoresis (Tiselius method), a filter paper electrophoresis, immunoelectrophoresis and electroimmunodiffusions.

The latter technique is carried out on a buffered gel in which antibodies specific to the protein or proteins being determined are fixed. The protein being determined is caused to migrate by the electric current and as the ratio of protein to antibody becomes favorable, the protein being determined forms a normally visible precipitate with the antibody in the gel. In certain cases an additional staining or enhancing step is required to render the precipitation zone visible as is conventional in the electrophoresis art.

The dimensions of the precipitation zone are directly related to the amount of the protein in the sample and in accordance with standard technique, standards having known quantities of the protein being determined are run simultaneously with the unknown.

Immunoelectrophoresis differs from electroimmunodiffusion in that in the former the antibody is not fixed in the gel but instead is allowed to diffuse into the gel after the protein of the sample has been first separated by electrophoresis.

The following specific examples described the manner in which the electromobility of certain proteins is enhanced and the beneficial results obtained thereby. Although the example describes specific embodiments, the invention is not to be construed as being limited to the specific embodiments set forth in the examples.

EXAMPLE I

In order to demonstrate the enhancement of electromobility of globulins in blood serum the following immuno-electrophoresis determination was carried out on serum albumin, IgG, serum albumin and IgG in saline solution, serum albumin and IgG reacted with gluteraldehyde and serum albumin and IgG reacted with formalin.

Serum albumin was obtained from the Blood Research laboratory and was identified as lot 458. The IgG was obtained from Armour Laboratories and identified as Lot No. L210503.

The antibody used in the experiment was horse anti(human) whole serum produced by ICL Scientific, Fountain Valley, California.

A glass electrophoresis plate was coated with an 0.8 mm thick gel coating comprising 1.5% agarose in a bartital buffer solution, pH 8.6. As illustrated in the FIGURE, the gel coating designated by the reference number 11 was provided with transversly aligned, spaced apart test wells 12. The wells 12 were separated by elongated, longitudinally extending troughs 13 to define therebetween parallel extending strips A, B. C, D and E.

Diluting solutions were prepared consisting of saline solution (9% NaCl), 1% w/v gluteraldehyde in the barbital buffer (pH 8.6) and 1% w/v formalin in the barbital buffer (pH 8.6).

The following test solutions were prepared:

| | | |
|---|---|---|
| Sample A | Albumin, IgG, Formalin | 1:1:4 |
| Sample B | Albumin, IgG, Gluteraldehyde Solution | 1:1:4 |
| Sample C | Albumin, IgG, Saline Solution, | 1:1:4 |
| Sample D | IgG, Gluteraldehyde Solution, | 1:4 |
| Sample E | Albumin, Gluteraldehyde Solution, | 1:4 |

Aliquots from each of the test solutions were placed in the wells 12 of the respective strips formed on the electrophoresis plate. The plate was supported between a pair of reservoirs containing the barbital buffer solution and paper wicks were used to provide a conductive bridge between the reservoirs and the gel coating 11 on the plate. The reservoirs were connected to a source of electrical current and, as illustrated, the right hand reservoir was the anode and the left hand reservoir the cathode. The electrophoresis was conducted by passing 100 volts of D.C. electricity across the gel coating 11 for a period of 2.5 hours. The total current flow was 40 milliamps.

At the completion of electrophoresis the current flow was discontinued and the troughs 13 was filled with the horse anti(human) whole serum diluted with distilled water in the ratio of 1:4 serum/water. The antiserum was allowed to diffuse into the gel until precipitation lines became visible, indicating the reaction between the test proteins and antibodies was substantially complete.

As illustrated in the FIGURE, the electrophoresis separated the protein fractions longitudinally along the strips A–E and the diffusion of antibody from the troughs 13 formed precipitation lines 14 at the points where the ratio of antibody to protein was high enough to form a visible precipitate. Strip A exhibited two definite precipitation lines with the ablumin, being the most electromobile, being drawn closest to the anode. The IgG was substantially unmoved by the current. It was clear that the formalin had no linking effect on the albumin IgG.

Strip B exhibited a signal precipitation area removed from the well 12 toward the anode. This indicated a single highly mobile protein group. There was no trace of any other precipitation area on the strip which evidenced a link between albumin and IgG.

Strip C showed two distinct precipitation areas with one protein being unmoved so that the precipitation zone was located substantially at the well 12.

Strip D showed a precipitation zone of low anodic mobility. The gluteraldehyde appears to improve the electromobility of IgG to a slight degree.

Strip E showed a single precipitation zone for the albumin.

From the test results it can be seen that the electromobility of albumin remains substantially the same in the presence of gluteraldehyde as in the presence of saline solution. Combining IgG with albumin without a linking agent has little or no effect on the electromobility of either protein. In the presence of a linking agent the IgG is carried along with the albumin during electrophoresis. Reacting IgG and gluteraldehyde alone provides only a slight effect on the electromobility of IgG, presumably due to the gluteraldehyde reacting with positively charged sites on the IgG molecule reducing the positive charge of the molecule.

EXAMPLE II

Aliquots of twelve specimens of human whole serum were prepared for electroimmunodiffusion by mixture with a buffered gluteraldehyde solution in the ratio of 4:1 serum/gluteraldehyde solution. The gluteraldehyde solution was prepared by dissolving 0.1 gm of gluteraldehyde in 100 ml of an aqueous buffer solution consisting of

| | |
|---|---|
| Tris(hydroxymethyl)aminomethane | 27.7 gms |
| Boric Acid | 7.6 gms |
| di-sodium ethylene diamine tetraacetic acid | 1.8 gms |
| Distilled water, qs | 1.0 liter |

The resulting buffer solution had a pH of 8.6 and conductance of 2.0 micro MHO. The serum-gluteraldehyde solutions were held for 30 minutes to insure completion of the linking reaction between the IgG and albumin.

A portion of the buffer solution was diluted with distilled water until a meter reading indicated a conductance of 1.0 micro MHO. To the diluted buffer solution was added 1.5% by weight of agarose. The agarose-buffer mixture was heated over a water bath until the agarose was dissolved in the buffer. The solution was allowed to cool to about 45°C.

The electrophoresis gel was prepared by diluting 1 part of horse anti(human) IgG serum, produced by ICL Scientific, Fountain Valley, California, with 4 parts of distilled water.

The diluted antiserum (0.5ml) was combined with 2 ml of the agarose-buffer solution and the total 2.5 ml poured into a 5×7.5 cm mold plate and allowed to harden by cooling to room temperature. Specimen wells were positioned along the short diameter of the plate adjacent the cathode end. Five sample wells were accommodated on the plate with one well for the sample and four wells for standards of known IgG concentration linked with serum albumin by gluteraldehyde. The standards were prepared with commercially available IgG and serum albumin.

A plate was prepared in the foregoing manner for each of the 12 whole serum specimens. Each plate was placed in an electrophoresis chamber and subjected to electrophoresis for a period of three hours at a potential of 100–120 volts. The plates were run in series of three and total current generated for the three plates was on the order of 10 to 20 milliamperes. The anode and cathode chambers contained the undiluted tris buffer solution, 2 micro MHO conductance.

Upon completion of electrophoresis, the plates were washed with saline solution. Well defined precipitation rockets extending toward the anode were produced by both the standards and unknown specimen. The distance from the center of the well to the tip of the rocket was measured and the quantity of IgG in each specimen was determined from a plot of the distance from the well to rocket tip versus IgG concentration of the standard sample run with each specimen.

To correlate the results samples of the serums were also subjected to quantitative determination by conventional radial immunodiffusion techniques. For these tests it was unnecessary to react the serum albumin and IgG of the serum with a linking agent since electromobility of IgG was not a critical factor. A 1.5% aragose gel containing the same concentration of anti(human) IgG serum as for the electrophoresis gel was utilized as the gel for the immunodiffusion. Immunodiffusion required 18–20 hours to complete.

The results of both techniques are set forth below:

| Serum Number | Radial Immunodiffusion (mg%) | Electroimmuno-diffusion (mg%) |
|---|---|---|
| 1 | 1130 | 1375 |
| 2 | 1300 | 1250 |
| 3 | 1525 | 1300 |
| 4 | 930 | 480 |
| 5 | 840 | 870 |
| 6 | 840 | 870 |
| 7 | 1375 | 1450 |
| 8 | 975 | 1140 |
| 9 | 1025 | 1250 |
| 10 | 1200 | 1050 |
| 11 | 1075 | 1150 |
| 12 | 1850 | 1625 |

With the exception of serum number 4 the foregoing results demonstrate correlation between the two methods. There is no indication that the linking reaction has any significant effect on the antigenic activity of the IgG to the extent that it interferes with the quantitative electrophoretic determination of IgG.

I claim:

1. A method for the electroquantitative determination of proteins which are normally only slightly anodically electromobile comprising the steps of:
   forming a reactive mixture of said protein, an anodic electromobile protein and an effective amount of a bifunctional linking agent;
   holding said mixture for sufficient period to form the reaction product of said protein, said linking agent and said electromobile protein;
   transferring said reaction product to a container provided with a conductive matrix through which an electric current is caused to flow, whereby said reaction product is electrophoretically moved in said matrix, said reaction product having the electromobility substantially that of the electromobile protein.

2. The method of claim 1 wherein the concentration of said bifunctional linking agent is less than that amount which reacts with protein to form a protein gel.

3. The method of claim 1 wherein said linking agent is selected from the group consisting of alkyl and aryl halides, bifunctional imido esters and lower alkyl dialdehydes.

4. The method of claim 1 wherein said linking agent is gluteraldehyde.

5. The method of claim 4 wherein the concentration of said gluteraldehyde in said reaction mixture ranges between about 0.005 M and about 0.02 M.

6. The method of claim 4 wherein the concentration of said gluteraldehyde in said reaction mixture is 0.008 M.

7. The method of claim 1 wherein said anodic electromobile protein is albumin.

8. The method of claim 1 wherein said reaction product comprises immunoglobulin.

9. The method of claim 8 wherein said immunoglobulin is selected from the group consisting of IgA, IgG, IgD, IgM, IgE and mixtures thereof.

10. The method of claim 1 wherein said mixture is held for a period of at least 15 minutes to form said reaction product.

11. A method for the electroquantitative determination of immunoglobulin comprising the steps of:
   forming a reaction mixture of an effective amount of aqueous gluteraldehyde solution, said immunoglobulin and serum albumin;

holding said reaction mixture for a sufficient period of time to form a reaction product between said immunoglobulin, said serum albumin and said gluteraldehyde;

transferring a portion of said reaction product to an electrophoresis plate comprising buffered agarose gel layer including an effective amount of antibody specific to said immunoglobulin;

electrically connecting said plate to an anode and cathode and passing a current through said gel layer containing said portion of said reaction product, whereby said reaction product migrates towards said anode at a rate greater than said antibody and contacts said antibody, said antibody reacting with said immunoglobulin to form a precipitin zone in said gel, said precipitin zone dimensions being proportional to the quantity of said immunoglobulin in said sample.

12. The method of claim 11 further including the step of adjusting and maintaining the pH of said gluteraldehyde solution to between about 7.5 and 8.6.

13. The method of claim 11 wherein the concentration of said gluteraldehyde in said reaction mixture is between about 0.005 M and 0.02 M.

14. The method of claim 11 wherein the concentration of said gluteraldehyde in said reaction mixture is 0.008 M.

15. The method of claim 11 wherein said gluteraldehyde solution comprises gluteraldehyde in an aquenous buffer solution having a pH of between 7.5 and 8.6.

16. The method of claim 15 wherein said pH is 8.6.

17. The method of claim 15 wherein said aqueous buffer solution comprises:

| | |
|---|---|
| Tris(hydroxymethyl)aminomethane | 27.7 gm |
| Boric acid | 7.6 gm |
| di-Sodium Ethylene Diamine tetraacetic acid | 1.8 gm |
| Distilled water, q.s. | 1000 ml. |

18. The method of claim 11 wherein the ratio of serum albumin to immunoglobulin is at least about 4:1.

19. The method of claim 11 wherein said reaction mixture comprises whole blood serum.

20. The method of claim 11 wherein said reaction mixture comprises whole human blood serum.

21. The method of claim 11 wherein said agarose gel comprises 1.5 wt percent agarose in solution buffered to a pH of between 7.5 and 8.6.

22. The method of claim 21 wherein said agarose gel solution is buffered to a pH of 8.6 and conductivity of 1 micro MHO.

23. The method of claim 21 wherein said buffer comprises:

| | |
|---|---|
| Tris(hydroxymethyl) aminomethane | 27.7 gm |
| Boric acid | 7.6 gm |
| di-Sodium Ethylene Diamine Tetracacetic acid | 1.8 gm |
| and sufficient distilled water to bring the conductance of said buffer to 1.0 micro MHO. | |

* * * * *

UNITED STATES PATENT OFFICE
CERTIFICATE OF CORRECTION

PATENT NO. : 3,912,610
DATED : October 14, 1975
INVENTOR(S) : Kingdon Lou

It is certified that error appears in the above-identified patent and that said Letters Patent are hereby corrected as shown below:

Column 1, line 11, change "increasing" to -- increasingly --;

line 57, change "praticularly" to -- particularly --;

line 66, change "blobulin" to -- globulin --;

Column 2, line 59 Change "immunoblobublin" to -- immunoglobulin --;

Column 3, line 1, change "electrobility" to -- electromobility --;

line 14, change "blobulins" to -- globulins --;

line 25, change "alubmin" to -- albumin --;

Column 5, line 56, change "tital" to -- bital --;

Column 7, line 62, change "aragose" to -- argarose --.

UNITED STATES PATENT OFFICE
CERTIFICATE OF CORRECTION

PATENT NO. : 3,912,610

DATED : October 14, 1975

INVENTOR(S) : Kingdon Lou

It is certified that error appears in the above-identified patent and that said Letters Patent are hereby corrected as shown below:

Column 1, line 47, delete second "are";

Column 2, line 50, "inn" should be changed to -- in --;
         line 60, "increease" should be changed to -- increase --;
         line 61, "improtance" should be changed to
                -- importance --;

Column 4, line 37, correct spelling of "admmixture".

Column 6, line 21, change "was" to -- were --;

Column 9, Claim 15, line 29, change "aquenous" to -- aqueous --.

Signed and Sealed this tenth Day of February 1976

[SEAL]

Attest:

RUTH C. MASON
*Attesting Officer*

C. MARSHALL DANN
*Commissioner of Patents and Trademarks*